Jan. 6, 1953 — G. A. LYON — 2,624,634
WHEEL COVER
Filed April 27, 1951 — 5 Sheets-Sheet 1

Inventor
George Albert Lyon
by Hill, Sherman, Meroni, Gross & Simpson Attys

Jan. 6, 1953          G. A. LYON          2,624,634

WHEEL COVER

Filed April 27, 1951          5 Sheets-Sheet 2

Inventor:
George Albert Lyon
by Hill, Sherman, Meroni, Gross & Simpson Attys

Jan. 6, 1953  G. A. LYON  2,624,634
WHEEL COVER
Filed April 27, 1951  5 Sheets-Sheet 5

Inventor:
George Albert Lyon
by Hill, Sherman, Meroni, Gross & Simpson Attys

Patented Jan. 6, 1953

2,624,634

UNITED STATES PATENT OFFICE 2,624,634

WHEEL COVER

George Albert Lyon, Detroit, Mich.

Application April 27, 1951, Serial No. 223,416

8 Claims. (Cl. 301—37)

1

The present invention relates to improvements in wheel covers such as are adapted to be applied to the outer sides of vehicle wheels, and more particularly concerns the provision of such covers having improved means for self-retention upon the wheels to which applied.

This application is a consolidation of my copending applications Serial No. 62,178, filed November 25, 1948, and Serial No. 154,221 filed April 6, 1950, of both of which the present application is a continuation in part, and of my copending applications Serial No. 49,240 filed September 14, 1948, Serial No. 34,380 filed June 22, 1948, now abandoned, and Serial No. 171,024, filed June 29, 1950, now abandoned, of which the present application is a continuation-in-part.

An important object of the present invention is to provide an improved ornamental and protective cover for the outer side of a wheel structure and which cover can be easily and conveniently applied by reasonable manual pressure but which can be conveniently pried free from the wheel without damage either to the wheel or to the cover so that the cover is indefinitely reusable and the wheel from which the cover may be removed will be free from damage but will remain in proper condition to receive another similar cover with full efficiency.

Another object of the invention is to provide an especially advantageous cover-retaining relationship between the tire rim of a vehicle wheel and a wheel cover.

A further object of the invention is to provide an improved ornamental wheel cover having novel self-retaining means engageable with the tire rim of a vehicle wheel.

Another object of the invention is to provide a wheel cover having an improved marginal flange and self-retaining finger structure engageable in resilient wedging, retaining relation with a generally axially extending surface portion of a wheel to which the cover is applied.

According to the general features of the invention there is provided in a wheel structure including a multi-flanged tire rim having an intermediate generally axially outwardly extending flange at its outer side, an ornamental and protective cover for the outer side of the wheel including an underturned marginal portion having rearwardly extending radially outwardly facing spaced retaining fingers inset from the perimeter of the cover, each of said fingers including a generally axial leg resiliently yieldable in a radial direction and arcuately curved in the circumference of the cover and a relatively short stiff leg turned generally radially and axially outwardly at a divergent angle to the curved outer surface of said axial leg and presenting an edge for wedging, gripping retaining engagement with said tire rim intermediate flange, said underturned marginal flange engaging with the tire rim at the outer side of said intermediate flange for delimiting axially inward movement of the cover on the wheel, said axial leg yielding in response to pressure against the extremity of said short stiff leg.

According to other general features of the invention there is provided a wheel cover or cap comprising a metallic stamping made from sheet stainless steel in a range of substantially 16 to 18–6 to 8 of austenitic character capable of developing martensitic structure on cold working and including spaced rearwardly underformed integral retaining resilient finger structure press work hardened into steel having the hardness and tensile characteristics of tempered spring steel.

A further feature of the invention resides in the provision of a circular wheel cover made from sheet metal and having a radially outer peripheral margin turned and provided with a plurality of annularly spaced retaining fingers each of which comprises a generally axially inwardly extending leg resiliently yieldable in a radial direction and arcuately curved in the direction of the circumference of the cover and terminating in a relatively short stiff retaining terminal flange portion extending radially and axially outwardly and having an edge for sliding retaining contact with a wheel surface inclined away from the fingers, said axial leg being yieldable in response to pressure against the edge of said short terminal flange in the application and removal of the cover.

Other objects, features and advantages of the present invention will be readily apparent from the following detailed description of certain preferred embodiments thereof taken in conjunction with the accompanying drawings, in which.

As shown on the drawings.

Figure 1:
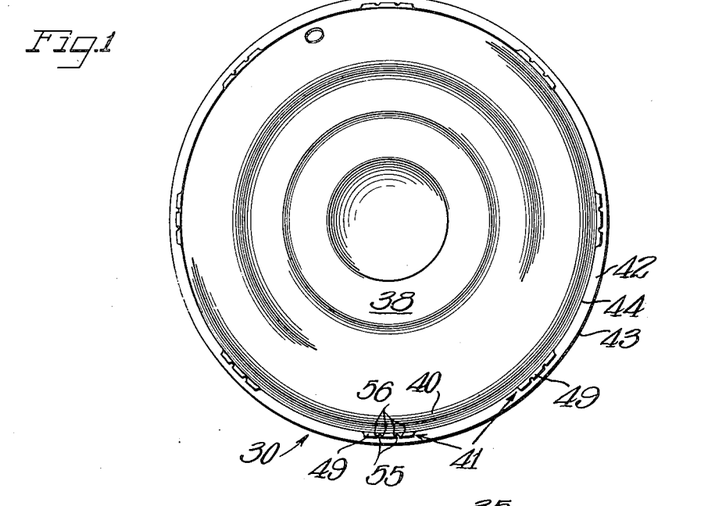
Figure 1 is a rear elevational view of a wheel cover or cap embodying the features of the present invention.
Figure 2:
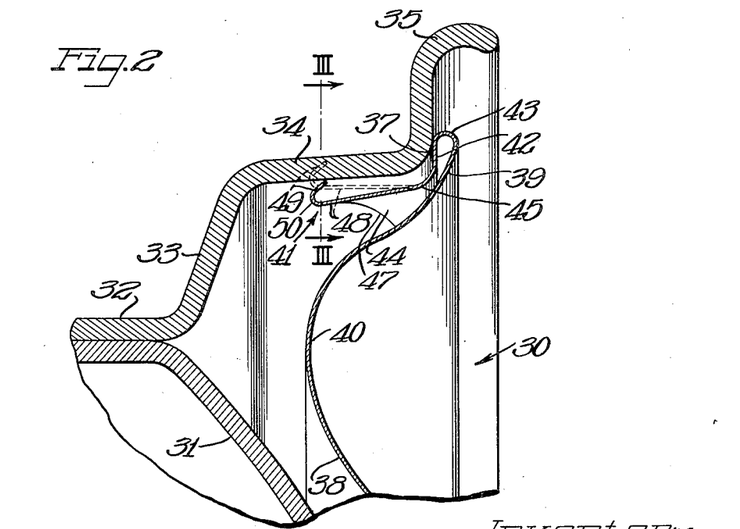
Figure 2 is a fragmentary radial sectional view through a vehicle wheel showing the cover of Figure 1 applied to the outer side of the wheel and indicated in radial section.

A wheel cover 30 (Figure 1), according to the present invention, is constructed and arranged to be applied to the outer side of a wheel, such as an automobile wheel, including a wheel body 31 and a tire rim 32 (Fig. 2). Both the wheel body and the tire rim may be formed from appropriate gauge sheet metal stamped or rolled to shape and the tire rim is of the multi-flange, drop center type adapted to support a pneumatic tire and tube assembly (not shown). To this end, the tire rim 32 includes a side flange 33 which extends generally radially outwardly, an intermediate generally axially outwardly and slightly radially outwardly tapered or generally frusto-conical intermediate flange 34, and a generally radially outwardly and axially outwardly extending terminal flange 35 which merges on a rounded shoulder 37 with the intermediate flange 34.

A significant feature of the cover 30 resides in the construction whereby the cover is self-retaining upon the wheel so that the wheel need not be equipped with any special structure or expedient for retaining the cover on the wheel. Thus, the wheel need have no special cover-retaining clips, it need not have any holes formed therein to receive clips or parts of the wheel, and no special grooves or protrusions or any other element or structure need be supplied on the wheel for retaining the cover, since the cover holds itself on the wheel. Furthermore, the cover 30 is so equipped with novel retaining means that it can be simply and easily applied to the wheel by simply pressing it into wheel covering, retained relation on the wheel. Removal of the cover from the wheel can be effected easily and expeditiously in the manner which has been customary for removal of automobile wheel hub caps, namely, by inserting a pry-off tool between the margin of the cover and the adjacent portion of the wheel and prying the cover from the wheel. In other words, means are provided for retaining the cover on the wheel in snap-on pry-off relation.

Where desired, of course, the cover 30 could take the form of a trim which will substantially cover the outer side of the tire rim and an adjacent portion of the wheel body, while a central hub cap covers the central, bolt-on flange portion of the wheel, but in view of the modern trend toward ever smaller wheels and larger tires, a full disk cover or cap is highly desirable since a single cover member thereby suffices on each wheel rather than having two cover members. The latter desirable end is attained with unusual effectiveness and success in actual practice not only for new vehicles but also by way of replacement accessory for existing vehicles. Automobile manufacturers are adopting the cover of the present invention in ever increasing numbers because of its many inherent advantages.

From both a structural and economic viewpoint, the objectives of the present invention are attained by a fairly simple construction wherein the cover 30 may be made entirely from a single piece of sheet metal, comprising a circular body portion 38 having a generally radially outwardly extending marginal portion 39 of a diameter to overlie the juncture shoulder 37 of the tire rim. In a preferred form the cover body radially inwardly from the marginal portion 39 is of dished, concave cross section providing a large radius generally axially inwardly extending rib 40 arranged to project into the relatively wide annular axially outwardly opening groove defined between the tire rim and the outwardly bulging wheel body 31. The central portion of the cover may be provided with any desired design configurations. The marginal portion 39 may be of convexly contoured cross section merging smoothly with the concave intermediate portion 40 of the cover.

Of the utmost importance are the structural features, characteristics and the functional relationships of the self-retaining means of the cover 30. To this end the outside diameter of the intermediate convex cover portion 40 is substantially less than the inside diameter of the tire rim intermediate flange 34 so as to provide a substantial radial space therebetween providing an ample clearance for novel retaining finger structure comprising an annular series of generally axially inwardly extending retaining fingers 41 which may be formed integrally in one piece with the cover margin 39. For this purpose, the cover margin 39 comprises an underturned generally radially inwardly extending flange portion 42 having juncture with the outer exposed marginal portion 39 on a small radius bead-like radially outwardly projecting reinforcing rib juncture 43 which in assembly with the wheel lies at its axially inner side against the tire rim juncture shoulder 37 or the immediately adjacent portion of the terminal flange 35. The cover margin 39 and the flange 42 together constitute a multiple of layers of metal at the outer peripheral margin of the cover and serve to reinforce the cover adjacent its pry-off edge or junction 43.

Figure 3:
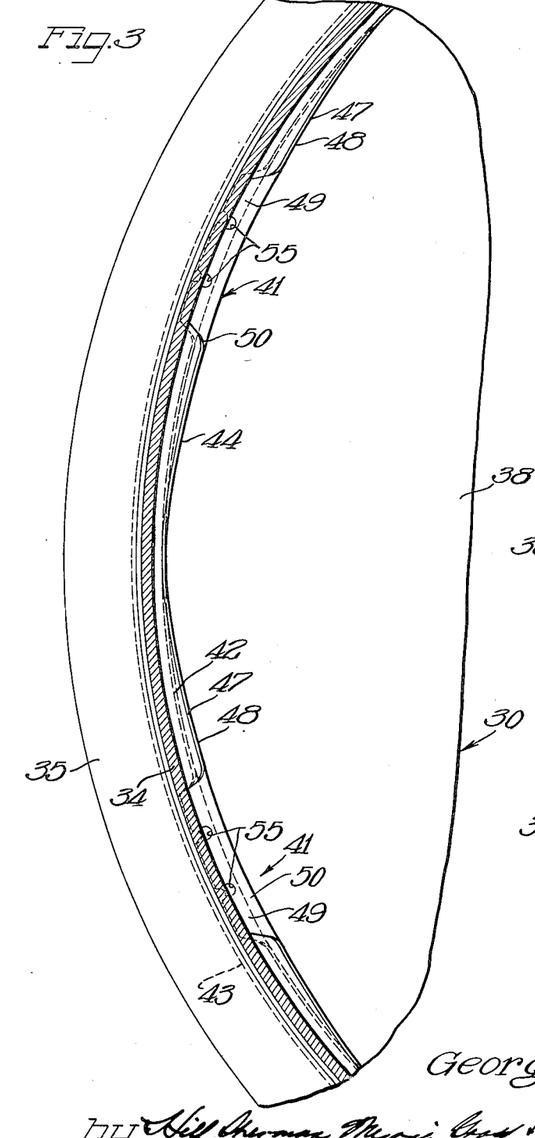
Figure 3 is a fragmentary sectional elevational view taken substantially upon the line III—III of Figure 2.
Figure 4:
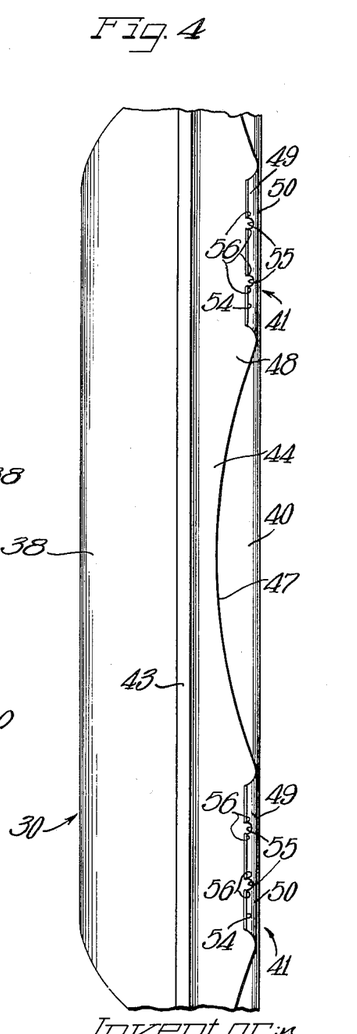
Figure 4 is an enlarged fragmentary side elevational view of the cover of Figure 1.

The underturned marginal flange 42 is provided with cover retaining finger means. In the form of Fig. 1, the flange 42 is of a radial extent to project radially inwardly beyond and clear of the tire rim shoulder 37 and merges with an axially inwardly extending ring-like flange portion 44 from which the retaining fingers 41 extend integrally in one piece therewith. As best seen in Figures 3 and 4, the marginal finger-carrying flange portion 44 joins the underturned flange portion 42 on a juncture shoulder 45 which at least in the unstressed condition of the fingers is preferably spaced from the opposing inner face of the cover body. Further, the retaining finger flange 44 is accommodated in the space or clearance between the tire rim intermediate flange 34 and the adjacent inwardly projecting intermediate cover portion 40.

It will be observed (Figs. 1, 2 and 3) that the inwardly extending flange portion 44 of the retaining flange structure is formed on a circle concentric with the cover and with the tire rim intermediate flange 34 but is of substantially smaller diameter than the inner face of the tire rim intermediate flange to remain in spaced relation thereto. The flange 44 is, however, of greater diameter than the contiguous cover portion 40.

Each of the retaining fingers 41 extends axially inwardly in the plane of the flange 44 and comprises an integral extension in one piece with the flange, actually comprising annularly spaced portions of the flange. For this purpose, the flange portion 44 is recessed at uniformly spaced intervals as indicated at 47 to define the individual retaining finger extensions 41 which are thus provided with finger back or body portions or legs 48. By having the cutouts or recesses 47 of generally arch shape the finger extension bodies or backs 48 are of flaring outline from their tips to the flange 44. That is, the finger backs are of substantially greater width at juncture with the flange 44 than the width of the fingers at their terminal portions. Furthermore, by having the recesses 47 of arcuate outline, the edges defining the cutouts are without any angular notches or other angular juncture with the body of the flange 44, but the sides of adjacent finger backs 48 merge on a continuous arc. Since the flange 44 is circular, and the finger backs 48 are formed in the plane of the flange 44, the finger backs 48 are also arcuately curved transversely on the curvature of the flange 44 and are thereby substantially stiffened so that they resist bending when radial pressure is applied thereto.

Each of the distal edge or terminal portions of the retaining fingers 41 is formed with an angular generally radially outwardly and somewhat axially outwardly projecting gripping extremity leg or flange portion 49. These gripping portions are joined integrally in one piece with their extension back body portion 48 by means of respective rib-like junctures 50 which are arcuate both in length and in cross section and afford a substantial stiffening reinforcement between the finger back and terminal flange portions.

To assure stiffness in the finger terminal flange portions 49, they are formed quite short relative to the finger backing body portions 48. Thus, it will be observed that each of the terminal gripping flange portions 49 is only a small fraction as long as its finger backing body portion 48. In a practical form, the terminal flange portions 49 may be only about one-fourth as long as the length of the finger backing portions from the juncture 50 to the juncture shoulder 45 of the retaining flange structure. The finger back portions 48, on the other hand, are strongly resiliently flexible in radial direction relative to the cover margin 39, although by reason of the bowed transverse cross section the portions 48 themselves are very resistant to bending on lines transverse to their length.

Figures 5, 6, 7:
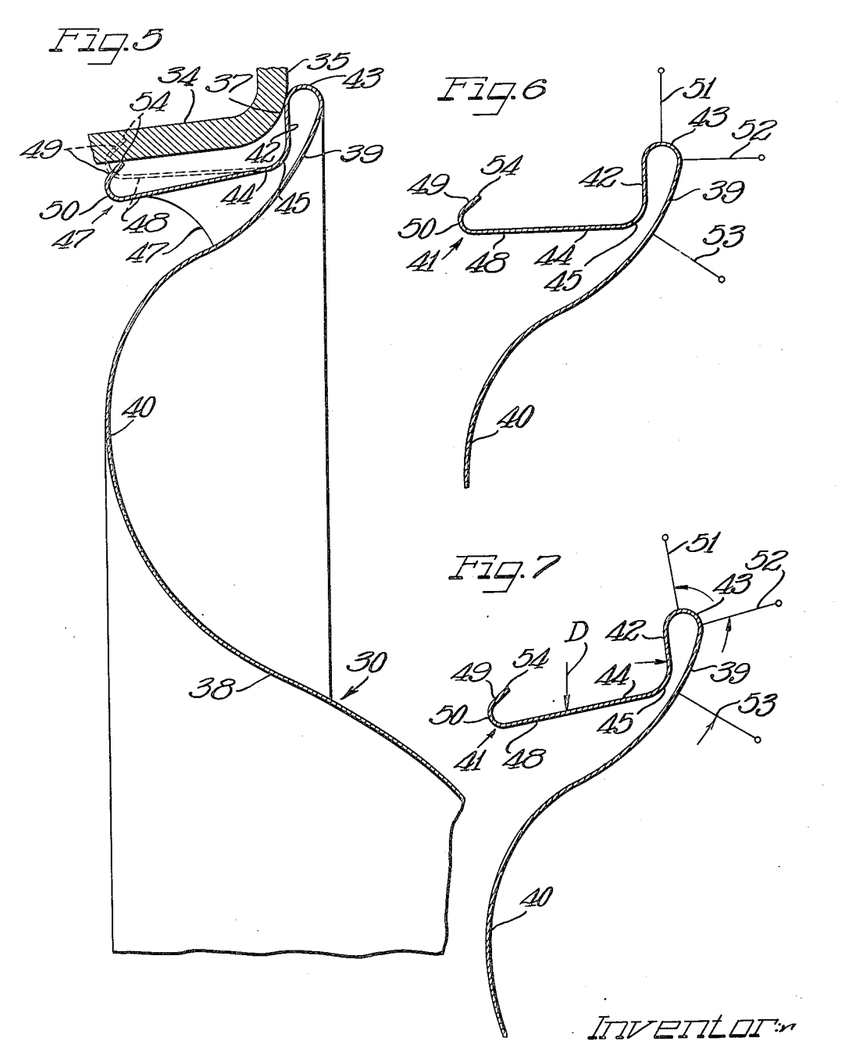
Figure 5 is a fragmentary radial sectional view similar to Figure 2 but on a larger scale and showing more or less schematically certain structural relationships inherent in the cover in greater detail for illustrative purposes.
Figure 6 is a fragmentary radial sectional view through a marginal portion of the cover taken along substantially the same section as in Figure 5 and showing the same in the unstressed condition of the retaining fingers.
Figure 7 is a fragmentary sectional view through the cover, similar to Figure 6, but showing the marginal structural relationships of the cover when the retaining fingers are placed under stress radially inwardly as occurs when the cover is applied to the wheel.

Prior to application of the cover 30 to the wheel, the flange 44 and the finger body backs 48 are generally cylindrical as indicated in dash outline in Figures 2 and 5 and in full outline in Figure 6, or they may be slanted slightly outwardly if desired. In this condition, the tips of the retaining terminal flanges 49 of the retaining fingers extend to a diameter substantially greater than the inside diameter of the terminal flange 34.

In applying the cover 30 to the wheel, the cover is generally centered with respect to the wheel and with the axially inner sides of the gripping terminal portions 49 of the fingers cammingly engaging at the axially outer margin of the tire rim intermediate flange 34 at or adjacent to the shoulder 37. Axially inward pressure is then applied to the cover, which causes the retaining finger terminal portions 49 to cam inwardly along the inner, frusto-conical face of the intermediate flange 34. Thereby, the finger terminal portions 49 are forced progressively radially inwardly and since the terminal portions 49 are relatively short and stiff and are rigidly reinforced by the respective juncture ribs 50, which have not only a transverse but also cross sectional, compound reinforcing radii, the radial inward pressure does not substantially deflect or bend the retaining terminal portions 49 but is reflected in resilient inward deflection of the finger extension body portions 48, as shown in full outline in Figs. 2, 5 and 7.

In the course of the progressive tensioning radially inward deflection, the finger backing portions 48 are resiliently deflected and flexed from the normal common circular position and form thereof to respective substantially larger or flatter radii at their base or proximal parts, the tension being enhanced by the flaring formation of the backing portions 48 and the mutual reinforcement afforded by the resistance to deflection of the base portions of the fingers by reason of their common annular connection in the flange portions 44 and 42. It will be noted, however, that on their longitudinal axis the finger legs or backs remain substantially undeformed by the general resilient flexing but in the form shown remain straight.

Since there is ample clearance between the bowed spring backing portions 48 of the retaining fingers and the adjacent intermediate portion 40 of the cover body, radially inward flexure of the retaining fingers is unhindered. Moreover, by having a spaced relation between the juncture shoulder 45 in the retaining flange structure and the opposing inner surface of the cover margin, further resilient tensioning is accomplished and avoidance of localized stresses prevails since radially inward stressing of the retaining fingers is reflected in a stressed condition of not only the flange 44, but also the underturned flange portion 42, the contiguous portion of the rib 43, and the adjoining portion of the cover margin 39.

This phenomenon is visually demonstrable by applying indicator pins to the cover marginal structure as shown in Figs. 6 and 7. Thus, an indicator pin 51 is mounted on the juncture rib 43 to extend radially outwardly. An indicator pin 52 is applied to the extremity of the cover margin 39 to project axially outwardly, and another indicator pin 53 may be applied to the marginal flange 39 adjacent juncture with the intermediate body portion 40 and to extend normal to the cover plane at the point of attachment.

Upon radially inward flexure of the retaining finger 41 as indicated by the direction arrow D in Fig. 7 there will be found to occur a generally axially outwardly deflectional movement of the flange portion 42 as indicated by directional arrow and a swinging of the indicator pins 51, 52 and 53 in the direction of the respective directional arrows associated therewith in Fig. 7 complementary to the retaining finger deflection.

This shows that the entire marginal formation of the cover cooperates in generating resilient tension in the retaining fingers to afford a thorough retaining, gripping, wedging engagement of the tips of the retaining flange terminal portions 49 of the fingers against the inner face of the tire rim intermediate flange 34. All of this results from the novel retaining flange and finger extension structure of the present invention wherein the retaining fingers 41 do not act as independent self-flexing fingers which bend about some flexure point intermediate their ends, but the retaining fingers 41 of the present invention are tied into the entire marginal flange structure of the cover and receive important resilient tensioning assistance from the flange and marginal structure of the cover substantially beyond the proximal or juncture ends of the fingers with the cover.

At their tips, the short, stiff retaining terminal flanges 49 are provided with abrupt edges defining at the axially inner sides of the terminals 49 tire rim flange gripping respective edges 54. This limits the actual area of contact of the retaining fingers with the tire rim flange surface to a thin line with wedging, gripping effect since as the retaining fingers 41 are flexed radially inwardly in the application of the cover to the wheel, the entire spring tension reaction imparted to or generated in the retaining fingers is reflected in and imposed upon the gripping edges 54 of the fingers. By reason of the stiffness and thus high resistance to flexing of the gripping flanges 49 of the fingers there is at least a small amount of turning of the tips of the finger terminal flanges 49 toward the surface of the tire rim flange as the fingers are flexed radially inwardly during application of the cover, and this tends to move the gripping edge 54 into more effective retaining engagement with the tire rim flange surface as the cover is pushed home on the wheel. Hence, in the fully applied position of the cover wherein the inner side of the marginal bead 43 rests against the tire rim, maximum retaining gripping efficiency of the retaining edge 54 is attained since at this point the associated retaining finger 41 will have been placed under maximum resilient cover retaining tension.

Although the tips of the retaining finger terminal flanges 49 are, as best seen in Fig. 1 formed arcuately complementary to the circular perimeter of the inner surface of the tire rim intermediate flange 34 so as to conform thereto for the purpose of making substantially uniform retaining engagement, imperfections in either the finger tips or the tire rim flange surface may tend to disrupt uniform engagement. Accordingly, each of the relatively wide retaining finger terminal flanges 49 is provided with one or more notches 55 extending only a short distance into the edge of the retaining flange and terminating short of the juncture shoulder bend or rib 50. This divides the engagement tip of each of the retaining finger flanges 49 into a plurality of sections each of which may have slight retaining engagement conforming adjustment to the surface of the tire rim intermediate flange but all of the sections are still connected integrally in one piece together so that the inherent stiffness of the retaining finger terminal flange 49 as a unit with respect to the relatively long flexible retaining finger body 48 persists. Thus, in spite of the fact that each of the retaining finger terminal flanges 49 is several times as wide as it is long and is rib stiffened at juncture with the flexible body of the retaining finger, the retaining terminal flange is nevertheless sufficiently self-equalizing in the sections of its retaining edge to compensate for possible manufacturing inequalities in the retainingly interengaging parts.

The notches 55 in the finger tips also increase the torque resistance of the cover on the wheel. This results from the provision of a plurality of side edge sharp corners 56 on the retaining edge 54 at the notches 55, and which corners in effect afford a multiplicity of torque resisting anchorage points.

Since there is ample clearance between the bowed spring back portions 48 and the adjacent inwardly projecting portion 40 of the cover body, radially inward flexure of the spring back portions of the retaining fingers is unhindered. As a matter of fact, considered in at least a radial sense, the cover is supported in floating resilient relation to the tire rim since a certain amount of radial movement is permitted by reason of the resiliently flexible retaining fingers and the flange 44 so that the cover can yield for shock relief should it brush against an obstruction, or the like. Furthermore, due to this flexible mounting finger and flange arrangement, the cover 30 is self-centering and quite adaptable to any inaccuracy that may be present in the tire rim and more especially in the intermediate flange 34 thereof.

By reason of the resilient flexibility of the mounting of the retaining fingers 41 of the cover, application of the cover 30 to the wheel is greatly facilitated and only moderate manual pressure need be applied to the cover to force the same into mounted relation on the wheel. On the other hand, the cover is quite effectively retained on the wheel since the inherent resilience of the fingers and the resilient tension under which the fingers are placed incident to mounting the cover, causes the gripping terminal flanges 49 to engage with such strong frictional, wedging, gripping relation against the intermediate flange 34 of the tire rim that substantial force is required to dislodge the cover. Due to the inherent resilience of the retaining fingers and the retaining marginal flange structure of the cover, the edges 54 of the finger terminals 49 will be prevented from digging into any substantial extent into the surface of the tire rim intermediate flange 34. Nevertheless, the substantial, uniform, radially outward resilient gripping force applied symmetrically by all of the fingers affords enough strong frictional engagement with the tire rim at the engaging edges 54 of the finger terminals to assure a firm hold upon the tire rim. As best seen in Fig. 1, symmetrical retention by the fingers is assured by having the fingers 41 located in an equally spaced pattern about the margin of the cover, eight of the fingers being shown in the illustrated embodiment, although a larger or smaller number of fingers could be used.

A certain amount of cushioning resilience is inherent in the cover 30 by reason of the particular resilient, reinforced marginal structure including the open radially outwardly directed fold defined by the cover margin 39 and the underturned flange 42, by which the retaining fingers 41 are inset from the edge of the cover. This results in a resiliently yieldable cover margin, so that if the cover is forced against an object while in service on a wheel a fair amount of give or cushioning action at the cover margin will save the cover from damage.

Removal of the cover 30 from the wheel is easily accomplished by means of a pry-off tool such as a screw driver inserted between the marginal reinforcing rib 43 and the shoulder 37 of the tire rim and the application of pry-off leverage to the margin of the cover. This not only shifts the cover 30 to a certain extent radially away from the point of pry-off tool force but also acts to relieve the gripping tension of the adjacent retaining finger or fingers 41 on the tire rim intermediate flange 34, while at the same time an axial outward component of pry-off force is applied to cause the retaining fingers in which the tension has been relieved to slide axially outwardly along the intermediate flange 34. Pry-off force thus applied at progressive spaced intervals throughout a segment of the periphery of the cover will shortly cant the cover to the point where the retaining fingers are released from their engagement with the tire rim and the cover can then be removed.

In removing the cover, neither the cover nor the tire rim are damaged since there is no need to overstress or force any portion of the cover to deflect beyond its elastic limits. Neither is the tire rim intermediate flange 34 gouged or unduly scored but the inner surface thereof remains undamaged. The short, broad, stiff retaining finger terminals 49 remain unaffected by the pry-off. Hence, the cover can be readily replaced upon the wheel or used upon another wheel, or another cover applied to replace the removed cover, without in any way impairing the efficiency or retention of the replacement cover or the cover that was removed. It will be appreciated that the cover 30 is of the easy-on, hard-off type, but at the same time self-retaining.

In the manufacture of the cover 30, it is desirable that from an economy standpoint the cover be made from as inexpensive material as practicable. It is also desirable that the material lend itself easily to a commercially acceptable finish. Sheet steel is a desirable material for this purpose, and more especially stainless steel, that is chrome-nickel steel. Among the valuable characteristics of such material is its ready workability in thin gauge stock and its ready adaptability to high lustrous polish or plating. Such lustre is effective in causing reflection as between the surfaces 38 and 39 shown in Figure 5. Another and very important attribute of chrome-nickel steel sheet has been found to reside in the fact that although in the sheet before working it has primarily austenitic characteristics, it is capable of developing martensitic character on cold working. The material from which the cover 30 is made should have these characteristics because it is desirable to form the cover by drawing the metal sheet to form. An austenitic steel lends itself well to die forming but does not possess sufficient hardness and resilience to afford adequate tensioning of the retaining fingers for the cover. However, where the material is capable of developing martensitic character, that is hardness which is an attribute of a tempered, resilient steel it is possible to make the entire cover from a single piece of material, including not only the drawn body portion of the cover but also the resilient spring retaining flange and finger structure.

Highly desirable results have been obtained by using sheet steel such as 16 to 18–6 to 8 chrome-nickel of stainless steel of from .019 to .021 inch thickness or gauge. Such material will have a tensile strength of from approximately 100,000 to 125,000 pounds per square inch and a yield strength of from approximately 47,000 to approximately 49,000 pounds per square inch, while the elongation of a blank specimen subjected to tests will be from approximately 53% to 58%.

While there may be various ways of making a wheel cover such as the cover 30, a method of making the cover to attain the desired form and functional characteristics on an efficient economical mass production basis comprises drawing the body portion of the cover and then drawing and cold working the marginal flange and retaining finger portion of the cover to change the austenitic material into martensitic character in the marginal portions of the cover, having the hardness and resilience requisite for the self-containing functions of the retaining fingers.

On testing the finished retaining fingers and turned over hollow marginal formation of the cover for tensile and yield strength it will be found that they have greatly increased over these same factors in the original blank stock. For example in a cover made from chrome-nickel steel of approximately .020 gauge and tensile strength of approximately 106,000 p. s. i. and yield strength of 49,000 p. s. i. with an elongation of approximately 57%, it was found that the tensile strength had increased in the finger and cold worked marginal portion of the cover to 140,000 to 143,000 p. s. i. tensile strength and 127,000 yield strength with an elongation of only 10% to 29%, showing a great increase in hardness and resiliency of approximately that of tempered spring steel. In other words, there was an approximately 25% increase in tensile strength and an increase in yield strength of about 62%, with a reduction in elongation to far below 50% of that in the original blank.

On typical specimens of finished covers subjected to critical Rockwell hardness test with a superficial hardness tester, the results have shown that the hardness of the retaining fingers and retaining flange structure on the finished cover, where it is made from a material testing 71.5 on the 30–T scale, that is, the scale for testing relatively soft steel, increased to a hardness of 56 on the 30–N scale adjacent to the terminals of the retaining fingers and to 50 on the N scale at the marginal bead of the cover, the 30–N scale on the Rockwell tester indicating the hardness of tempered spring steel. This indicates a great increase in hardness over the hardness of the original stock, due to the cold working to which the marginal portions of the cover have been subjected in making the cover.

Figures 8, 9:
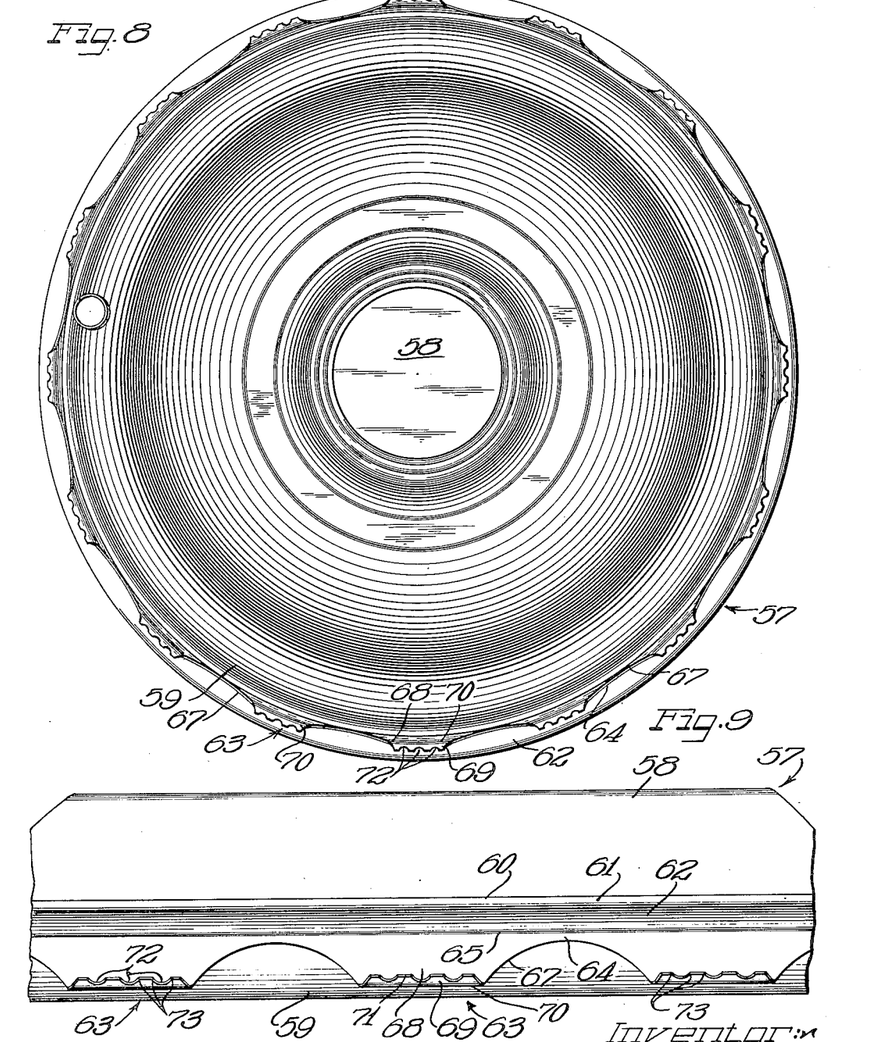
Figure 8 is a rear elevational view of a modified form of the cover.
Figure 9 is an enlarged fragmentary side or edge elevational view of the cover of Figure 8.

While it is preferred to make the cover from chrome nickel steel sheet as explained in some detail hereinbefore, it has been found that where this material is not available for some reason because of scarcity or governmental restrictions upon use, a satisfactory cover using the principles of the invention can be fabricated from material of lesser quality by using the principles of the present invention. I have found, for example, that the modification of Figs. 8 and 9 showing a wheel cover 57 according to the present invention can be successfully made from cold rolled low carbon steel sheet.

The cover 57 may comprise either a trim ring shaped member or a full cover as shown including a suitably shaped crown body 58 merging with an annular outwardly opening groove and inwardly extending rib formation 59 of generally dished cross section bordered at its radially outer side by a generally radially outwardly extending margin 60. Similarly as in the cover 30, the margin 60 is turned under on a rounded bead edge formation juncture 61 to provide an underturned generally axially inwardly extending continuous annular flange 62.

Through the medium of the underturned flange 62, the cover margin 60 carries a cover retaining finger structure comprising a substantial plurality of cover retaining fingers 63 disposed in uniform spaced pattern behind the margin 60. Each of the retaining fingers 63 is formed integrally in one piece and has an extension of a generally axially rearwardly or inwardly extending flange portion 64 joining on a radius juncture 65 with the underturned flange 62 and as a portion of such underturned flange. Appropriate preferably arcuate cutouts 67 in the axial flange 64 provide the finger extensions which are thus of broad base merging with the bases of the respectively adjacent finger extensions and tapering toward substantially narrower distal end portions.

Each of the finger extensions comprises an axially extending body or leg portion 68 which, while it is of substantial length, is nevertheless preferably of greater width than length and is formed on an arcuate stiffening curvature preferably substantially concentric with the perimeter of the cover.

At the distal terminus of each of the body portions 68 of the fingers is provided a generally radially outwardly and axially outwardly or forwardly directed short and stiff retaining leg or flange 69 having juncture with the body leg portion on a curved juncture 70 which is formed on a small cross sectional radius and on a long or circumferential radius that is substantially concentric with the periphery of the cover. This renders the retaining finger flanges 69 quite stiff and substantially rigid relative to the finger body leg portions 68 with respect to which the retaining finger flanges 69 are quite short.

Each of the retaining finger flanges 69 has on its outer edge a longitudinal retaining corner 71 for effecting retaining, wedging and gripping engagement with the inner face of the intermediate flange of a tire rim to which the cover may be applied, similarly as described in connection with the cover 30. For equalization of grip and also to afford torque-resistance in the retaining engagement of the fingers with the tire rim, the retaining flanges 69 are each provided with a plurality of shallow notches 72 providing at the sides thereof at the retaining edge corner, respective edge torque-resistance corners or points 73.

In the drawing of the cover, the marginal formation 60 and the edge bead 61 together with the flange 62, 64 and the retaining fingers 63 are cold work hardened to impart substantial resilience thereto. Furthermore, the particular structure of the retaining finger extensions 63 and the relationship thereof to the continuous, ring-like annular flange structure assures such resilience and resilient resistance to radial deflection of the retaining fingers 63 when the cover is applied to the wheel back, the resilient tensions developed and reflected in the gripping engagement of the edges of the retaining finger terminal flanges 69 with the tire rim will assure thorough retention of the cover on the wheel.

It may be noted that because of the relatively soft and therefor inherently relatively low resilience of the cold rolled, low carbon material, so that in the end result not as great resilience can be attained as with the chrome-nickel steel sheet hereinbefore discussed, it is desirable to increase the number of the retaining fingers 63. In a practical form, 16 fingers have been found satisfactory whereas with the chrome-nickel steel 8 fingers have been found adequate. By increasing the number of retaining fingers or teeth 63 so as to distribute the resilient tensions to which they or the marginal flange structure are subjected in use and thus avoiding stresses beyond the elastic limits of any portion of the retaining structure, there is maintained a workably resilient condition without any local portion of the structure taking a set under ordinary conditions in use. This is of particular importance for pry-off removal of the cover from the wheel without overstraining any part of the cover retaining finger structure.

It may also be noted that to improve the resilient gripping tension under which the retaining fingers 63 of the cover of softer material are placed when mounted on the wheel, the axial flange 64 and the finger bodies or legs 68 are angled normally slightly outwardly. This affords some compensation for the lesser hardness and thus lesser resilience of the material.

Figure 10:
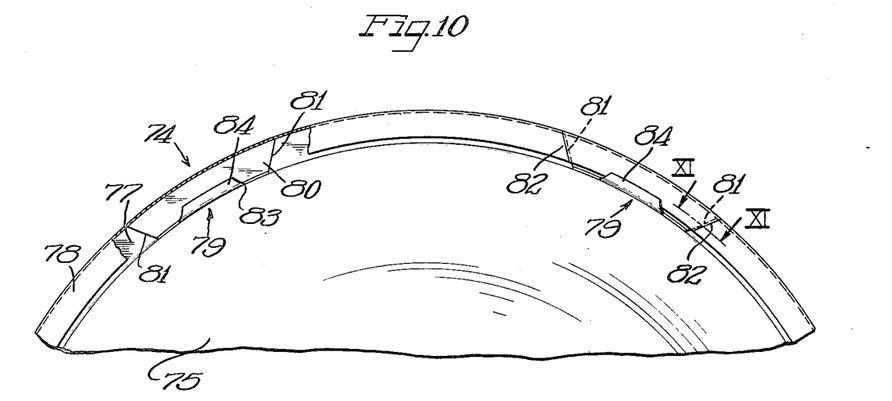
Figure 10 is a fragmentary rear elevational view of a further modified form of cover with a part broken away to show details of structure.

In the modification of Figure 10, a circular wheel cover 74 is provided which includes a body portion 75 that may be shaped as preferred. At the outer margin of the body portion 75 is a generally radially outwardly extending marginal portion 77 having an underturned, return bent annular flange 78. Through the medium of the flange 78 the cover is provided with cover retaining means comprising a plurality of retaining fingers 79 disposed in proper annularly spaced relation.

Figure 11:
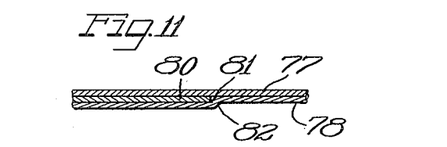
Figure 11 is an enlarged fragmentary sectional detail view taken substantially along the line XI—XI of Figure 10.

Each of the retaining fingers 79 comprises a separate element including a base flange 80 which is crimped or clamped to the outer marginal part 77 of the cover by the underturned flange 78. Means for retaining the base portion 80 against displacement inwardly or circumferentially relative to the cover margin comprise having the opposite ends of the base flange portion 80 flared outwardly as indicated at 81 and with the flange 78 crimped in at the flaring end edges 81 retainingly as shown at 82 in Fig. 11.

Each of the retaining finger elements 79 includes an axially inwardly extending leg or body terminating in a radially and axially outwardly extending short and stiff retaining terminal flange or leg 84. The finger body or leg 83 tapers from a substantially wider base or proximal end at juncture with the base flange 80 to a substantially narrower distal or retaining flange end. For stiffness, the finger body 83 is arcuately bowed transversely preferably conforming concentrically with the periphery of the cover. Juncture of the retaining finger flange 84 with the body is on a curved small radius cross section and also longitudinal curvature conforming to the arcuate curvature of the finger body. Thereby, the retaining finger terminal flange 84 of each of the fingers, which is quite short relative to the length of the finger body, is quite stiff and substantially unyielding so that when the cover is mounted on a vehicle wheel in the same manner as described in connection with the cover 30, with the edges of the finger terminals 84 gripping the intermediate flange of a tire rim, the finger bodies 83 are deflected radially inwardly and substantial resilient tension is created to drive the edges of the finger terminal flanges 84 into thorough wedging, retaining gripping action against the tire rim flange.

Since the bodies or legs 83 of the fingers are substantially stiffened and thereby resist bending, the radially inward deflecting force causes the fingers to tension the cover margin through the interengaged finger bases 80 and the underturned marginal flange structure. Thereby, the inherent resiliency of the marginal flange structure of the cover is utilized in tensioning the retaining fingers to maintain a thorough cover retaining grip on the tire rim. At the same time, the cover 74 is possessed of the substantially radial floating characteristics as described for the cover 30.

Figure 12:
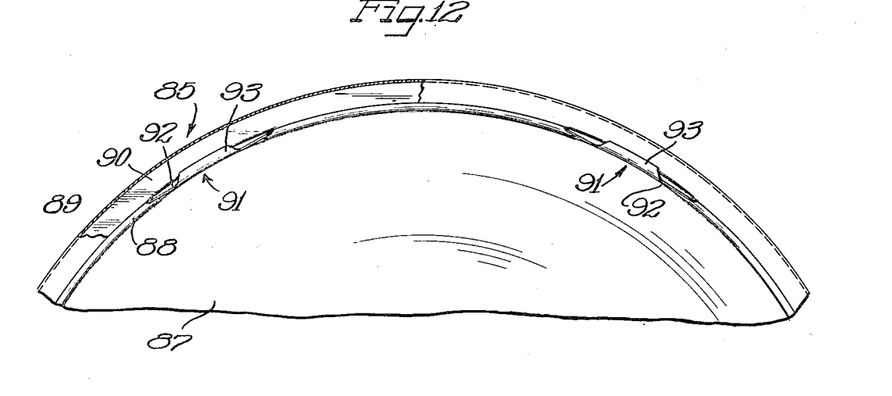
Figure 12 is a fragmentary rear elevational view of a further modified form of the cover with a portion broken away to reveal details of structure.

In the modification of Figure 12, instead of having the retaining fingers formed as individual units, a circular wheel cover 85 is provided including a body 87 on which a radially outer margin 88 has an underturned annular generally radially inwardly extending flange 89 which is crimped into clamping, retaining engagement with a retaining finger annulus 90. By preference, the annulus 90 is formed as a continuous ring with the inner edge of the ring substantially continuous with the inner edge of the underturned marginal flange 89 but permissibly extending slightly radially inwardly therefrom.

Extending as axially inward extensions of the inner margin of the retaining ring 90, are respective retaining fingers 91 provided in suitable plurality in uniformly spaced pattern about the margin of the cover. Each of the fingers 91 includes a body portion 92 which, similarly as in the other forms of the cover already described has a substantially wider base than tip portion and is also preferably substantially shorter than wide while possessing ample length to perform the cover retaining functions thereof satisfactorily, similarly as the retaining fingers 41 of the cover 30. Each of the retaining finger extension bodies or legs 92 is of transversely curved form substantially conforming to the curvature of the cover periphery and is thereby materially stiffened to resist bending or buckling.

The terminal portion of each of the retaining fingers 91 is provided in the form of a generally radially and axially outwardly turned stiff retaining finger flange 93 having its cover retaining edge curved to facilitate engagement with the intermediate flange of a tire rim, similarly as the retaining edges of the other forms of the cover already described. The short retaining flange legs 93 are substantially shorter than the respective finger bodies 92 and join the same on a juncture having both a cross sectional small radius and a longitudinal longer radius so that the juncture is of such stiffness that there is substantial preclusion of bending of the retaining finger flanges 93 relative to the finger bodies supporting the same. As a result, when the cover is applied to a wheel the retaining fingers firmly engage the intermediate flange of the tire rim with a tensioned gripping engagement of the edges of the retaining finger terminal flanges 93. Substantial resilient tension is afforded by the continuous retaining flange 90 of the retaining finger structure and also the inherent resiliency of the marginal flange structure of the cover which is placed under resilient stress by the radially inward deflection of the retaining fingers 91 when the cover is on the wheel.

Both of the covers 74 and 85 can be readily pried free from a wheel to which applied by the application of pry-off force between the reinforced, flanged margin of the cover and the underlying tire rim. Similarly as the other covers described, the cover 85 is mounted in substantially radial floating condition generally similarly as described for the cover 30.

By reason of the separate retaining finger or element structures of the covers 74 and 85, the body portion of the covers can be made from relatively inexpensive materials such as low carbon, cold rolled steel sheet while the finger structures are made from a harder and more resilient material or are hardened to afford them the stiffness and resiliency desirable for proper functioning. For example, the finger structures may be made from chrome-nickel stainless steel sheet material cold work hardened, or the finger structures may be made from more common and less expensive material subjected after formation to some suitable hardening and tempering process.

It will be understood that modifications and variations may be effected without departing from the scope of the novel concepts of the present invention.

In the appended claims, by gripping, retaining or biting engagement is meant such cover retaining engagement as will result in the cover being held on the wheel when it is in running operation and being subjected to road conditions.

By axial direction is meant extending generally in the direction of the axis of the circular wheel or cover. For illustration, the flange portions 42 and 44 are generally axially inwardly or rearwardly of the cover body and are also substantially continuous circumferentially of or around the cover. In addition, flange portion 44 is circular around the cover axis and, hence, is arcuately curved circumferentially of the cover. It is also resilient and has extensions or fingers 41 which are spaced circumferentially around the cover or wheel axis and are generally axially rearward of the cover.

By radial direction is meant extending generally in the direction of the radii of the circular wheel or cover. For illustration, the terminals of finger extensions 41, 79, and 91 all extend generally radially for cover retaining engagement with the wheel and are relatively stiffer than the fingers or extensions proper so that upon being stressed, in the application and removal of the cover, they are backed up by the finger extensions which will resiliently yield in a generally radial direction.

By tapering side or lateral edges is meant that the foregoing fingers or extensions each have side edges that progressively converge toward the terminal end of the finger whereby the finger is wider at its base or junction with the cover than at its free terminal end.

By stiff terminal is meant that the gripping or retaining terminal of the resilient finger or extension is, with respect or relative to the finger and flange, more rigid so that the finger will yield in response to pressure on the terminal.

By self centering is meant that the fingers individually all exert substantially a uniform resilient pressure in centering the cover when in place on the wheel so that the cover will be held substantially concentric with the wheel.

I claim as my invention:

1. A circular wheel cover having a peripheral turned margin provided with a generally axially rearwardly extending continuous circular flange, said axial flange having arcuate spaced cut away sections alternating with rearwardly extending cover retaining portions all connected together in said continuous flange, each of said portions terminating in a turned radially extending stiff edge of relatively narrow width in a radial direction, each of said axial flange portions being resiliently yieldable in a radial direction upon its stiff edge engaging the wheel and when thus stressed applying resilient pressure to hold the edge in resilient gripping engagement with the wheel.

2. In a cover for a wheel including a multi-flanged drop center tire rim member and a supporting body member therefor, a circular dished wheel cover for telescoping nested engagement with one of said members having a peripheral turned margin provided with a generally axially rearwardly extending continuous circular axial flange generally parallel to said axial rim flange and spaced therefrom, said axial flange having arcuately curved spaced cut away sections alternating with rearwardly extending arcuately curved yieldable cover retaining portions, each of said portions terminating in a radially turned stiff edge inclined and being of relatively narrow width in a radial direction, each of said flange portions being resiliently yieldable rearwardly of said margin in a radial direction upon its stiff edge engaging one of said wheel members and when thus stressed applying resilient pressure to wedge said edge in resilient gripping engagement with the wheel.

3. In a wheel structure including a multi-flanged tire rim having an intermediate generally axially outwardly extending flange at its outer side, an ornamental and protective cover for the outer side of the wheel including a marginal portion having rearwardly extending radially outwardly facing spaced retaining fingers inset from the perimeter of the cover, each of said fingers including a generally axial leg resiliently yieldable in a radial direction and arcuately curved in the circumference of the cover and a relatively short stiff leg turned generally radially and axially outwardly on a divergent angle to the curved outer surface of said axial leg and presenting an edge for wedging, gripping retaining engagement with said tire rim intermediate flange, said marginal flange engaging with the tire rim at the outer side of said intermediate flange for limiting axially inward movement of the cover on the wheel, said axial leg yielding in response to pressure against the extremity of said short stiff leg.

4. In a cover structure for a wheel including flanged tire rim and body parts, a resilient snap on and off circular cover member having a rearwardly turned outer peripheral edge and having extending rearwardly and radially inward from said edge a continuous annular flange spaced in close relation to the rear side of said member, said flange being resiliently connected to said turned edge so as to be bodily movable toward and from said rear side and terminating in cover retaining finger means projecting therefrom, said means being turned radially and outwardly in an inclined plane forming a relatively short leg at an acute angle to the flange proper for gripping engagement with one of said wheel parts, the turned flange portion being notched transversely of its width providing separated wheel gripping finger extremities in said plane which are movable bodily with the flange proper in the application and removal of the cover member, said flange and its extremities being circumferentially arcuate and said flange being relatively long in an axial direction as compared to said short stiff leg at an acute angle thereto.

5. In a cover structure for a wheel including flanged tire rim and body parts, a resilient snap on and off circular cover member having a rearwardly turned outer peripheral edge and having extending rearwardly and radially inward from said edge a continuous annular flange spaced in close relation to the rear side of said member, said flange being resiliently connected to said turned edge so as to be bodily movable toward and from said rear side and terminating in cover retaining finger means projecting therefrom, said means being turned radially and outwardly in an inclined plane forming a relatively short leg at an acute angle to the flange proper for gripping engagement with one of said wheel parts, the turned flange portion being notched transversely of its width providing separated wheel gripping finger extremities in said plane which are movable bodily with the flange proper in the application and removal of the cover member, said cover member proper being of sheet steel of austenitic character and said flange and its extremities being arcuate and having the characteristics of tempered martensitic spring steel by reason of the cold working of same.

6. A circular wheel cover made from sheet metal and having an outer peripheral margin reinforced by multiple layers of metal extending generally radially and defining a shoulder formed to fit over a part of a wheel rim, said margin having therebehind and spaced radially inwardly from its edge a generally axially extending flange provided with a plurality of finger extensions resiliently yieldable in radial directions and mutually resisting such yielding by the common connection through said flange, said extensions having radially outwardly extending short and stiff angular terminals for biting engagement with a surface of the wheel, said flange and resilient extensions and stiff terminals cooperating with each other in self-centering the cover on the wheel.

7. The cover of claim 6 further characterized by each of said stiff angular terminals having a notched biting edge providing a plurality of spaced torque resisting wheel engaging points.

8. The cover of claim 7 further characterized by said extensions, including their terminals, being arcuately curved circumferentially of the cover.

GEORGE ALBERT LYON.

REFERENCES CITED

The following references are of record in the file of this patent:

UNITED STATES PATENTS

| Number | Name | Date |
|---|---|---|
| 1,944,658 | Griffith | Jan. 23, 1934 |
| 2,368,228 | Lyon | Jan. 30, 1945 |
| 2,404,389 | Lyon | July 23, 1946 |

FOREIGN PATENTS

| Number | Country | Date |
|---|---|---|
| 271,126 | Italy | Jan. 30, 1930 |